United States Patent [19]

Apotheker

[11] 4,093,583

[45] June 6, 1978

[54] PEROXIDE VULCANIZATION OF OIL-EXTENDED ELASTOMERIC ETHYLENE COPOLYMERS CONTAINING BROMINE

[75] Inventor: David Apotheker, Wilmington, Del.

[73] Assignee: E. I. Du Pont de Nemours and Company, Wilmington, Del.

[21] Appl. No.: 728,003

[22] Filed: Sep. 29, 1976

[51] Int. Cl.² .............................................. C08K 5/01
[52] U.S. Cl. .............................. 260/33.6 AQ; 526/57
[58] Field of Search ................. 260/33.6 AQ; 526/19, 526/20, 43, 57

[56] References Cited

U.S. PATENT DOCUMENTS

| | | | |
|---|---|---|---|
| 3,222,330 | 12/1965 | Nyce | 260/80.5 |
| 3,506,742 | 4/1970 | Buckler | 260/889 |
| 3,632,671 | 1/1972 | Furukawa | 260/876 |
| 3,635,865 | 1/1972 | Edwards | 260/33.6 AQ |
| 3,657,046 | 4/1972 | Furukawa | 260/889 |

Primary Examiner—Paul R. Michl

[57] ABSTRACT

A peroxide curable composition of an elastomeric unsaturated ethylene/$C_3$-$C_{18}$ α-monoolefin/nonconjugated diene copolymer (EODM) containing at least about 0.1 weight percent allylic bromine, at least 20 phr of a hydrocarbon extending oil, about 1–5 phr (active ingredient) of an organic peroxide curing agent, and an unsaturated peroxide activator.

14 Claims, No Drawings

PEROXIDE VULCANIZATION OF OIL-EXTENDED ELASTOMERIC ETHYLENE COPOLYMERS CONTAINING BROMINE

BACKGROUND OF THE INVENTION

The invention relates to new, heavily oil extended, peroxide curable unsaturated ethylene copolymer compositions that, when cured, result in an elastomer having excellent physical properties equivalent to those of peroxide cured compositions which have no oil.

Peroxide curable ethylene/higher α-olefin/non-conjugated diene copolymers (EODM) are useful for wire and cable jackets, radiator hose, electrical connectors, and in ozone resistant blends with natural rubber, SBR, and other highly unsaturated elastomers. Peroxide cured EODM elastomers are preferred for certain uses because they show better heat stability than sulfur cured EODM's; that is, their physical properties do not change significantly when they are exposed to high temperatures during extended use.

It is economically desirable and often advantageous from a processing standpoint to incorporate substantial amounts, e.g., as much as 100 phr or more, of extending oils in the ethylene copolymer composition. Unfortunately, high oil dilution of these unsaturated ethylene copolymers creates problems when a peroxide cure is contemplated, as noted by Baldwin and ver Strate [Rubber Chem. & Tech. 45 No. 3, p. 806 (April 1972)] because the peroxide can react with the oil as well as with the copolymer; therefore, in effect, the oil lowers the effectiveness of the peroxide, decreases the rate of cure, and lowers the state of cure attained. An EODM composition that contains large quantities of extending oil and, in spite of the presence of the oil, is curable by employing conventional amounts of peroxides to products having good physical properties has been a goal of the industry.

SUMMARY OF THE INVENTION

It has now been discovered that oil-extended ethylene/higher α-olefin/nonconjugated diene (EODM) copolymers can be effectively peroxide-cured to elastomeric compositions having excellent physical properties provided that the EODM is allylically brominated. More specifically, this invention relates to a peroxide vulcanizable composition comprising an EODM copolymer of ethylene, at least one $C_3$-$C_{18}$ α-monoolefin, and at least one monoreactive nonconjugated diene containing at least about 0.1 weight percent, generally 1-6 weight percent, allylically incorporated bromine, at least about 20 phr of a hydrocarbon extending oil, about 1-5 phr (active ingredient) of an organic peroxide, and an unsaturated peroxide activator. The term "phr" means "parts per 100 parts of copolymer rubber". This composition is cured conventionally by heating. The cure rate is significantly faster than that of compositions differing only in that the copolymer has no allylic bromine, that is, compositions where EODM is substituted for allylically brominated EODM. Furthermore, the state of cure of the subject compositions is much improved as evidenced by modulus, set at break, and compression set values.

DETAILED DESCRIPTION OF THE INVENTION

EODM copolymers are well known and prepared by conventional coordination catalysis using Ziegler-Natta catalysts (preferably, those based on combinations of vanadium compounds, such as $VOCl_3$ or $VCl_4$, and organoaluminum compounds, such as isobutyl or ethyl aluminum chlorides). The higher α-monoolefins used in making the EODM copolymers usually have the structure $RCH_2$-$CH$=$CH_2$, where R is H or $C_1$-$C_{15}$ alkyl. Propylene is particularly preferred (giving EPDM copolymers). The monoreactive nonconjugated dienes include 1,4-hexadiene, 5-ethylidene-2-norbornene, 5-(1-propenyl)-2-norbornene, 5-(2-butenyl)-2-norbornene, 2-ethyl-2,5-norbornadiene, and dicyclopentadiene. There should be sufficient —C=C— groups with adjacent allylic H-atoms in the nonconjugated diene to permit adding the requisite amount of allylic bromine to the copolymer. Representative EODM elastomers are described, among other places, in U.S. Pat. Nos. 2,933,480 and 3,211,709. In addition to conventional EPDM rubbers, which are usually tripolymers, tetrapolymers of ethylene, propylene, a nonconjugated monoreactive diene, and a small amount of a nonconjugated direactive diene can also be used. The latter polymers may be thought of as a special class of EPDM rubbers. They are specifically described in U.S. Pat. No. 3,819,591 to Campbell and Thurn. Furthermore, tetrapolymers of ethylene, propylene and two nonconjugated monoreactive dienes can be allylically brominated. These tetrapolymers are considered to be conventional EPDM rubbers, although less commonplace than tripolymers. Such polymers are described in U.S. Pat. Nos. 3,651,032 to Cameli and 3,554,988 to Emde et al. A typical such polymer would be, for example, an ethylene/propylene/1,4-hexadiene/5-ethylidene-2-norbornene copolymer.

The allylically brominated copolymer can be prepared by reacting an EODM with bromine or a compound from which the bromine radicals necessary to carry out the reaction may be extracted. Conversion of bromine to allylic bromine is about 100 percent. Any conventional procedure for allylic bromination is suitable, such as described in Rubber Chemistry and Technology 44 No. 4, p. 1025 (Sept. 1971), and Rubber Chemistry and Technology 49, No. 2, p. 353 (1976). The EODM copolymer can thus be brominated with liquid bromine at a temperature of at least about 70° C, usually said reaction being run at atmospheric pressure under reflux conditions. During the bromination reaction hydrogen bromide vapor released from the reaction mass is swept out as rapidly as possible; when hydrogen bromide vapor is no longer detected coming off the solution, the bromination reaction is complete. Preferably, when elemental bromine is used, it is desirable to add small quantities of a free radical initiator, e.g., an organic peroxide such as benzoyl peroxide, during bromination; the initiator aids the generation of bromine radicals. The bromination reaction is carried out in any inert solvent, i.e., one that is inert to bromine. Perhalogenated solvents are preferred. Carbon tetrachloride is most commonly used; tetrachloroethylene or hexachloro-1,3-butadiene are alternatives. Temperatures below 70° C are avoided to minimize the undesired addition of bromine to the —C=C— groups of the monoreactive nonconjugated diene of the EODM copolymer. The desired allylic introduction of bromine is further enhanced by diluting the bromine and adding the resulting solution slowly to the EODM copolymer.

If N-bromosuccinimide is employed as the brominating agent, the reaction temperature may be room temperature; higher temperatures, e.g., 60° C, or reflux temperature, are preferred, however. The use of a free radical generator, e.g., an organic peroxide such as benzoyl peroxide, is optional but preferred.

The allylically brominated EODM copolymer can be isolated by any conventional procedure for recovering EODM polymers, e.g., drum drying, treatment with steam, phase decantation at elevated temperatures, and precipitation with a non-solvent such as methanol.

Any hydrocarbon extending oil, such as conventional aliphatic and aromatic petroleum oils used as extenders for synthetic rubber, can be used in the composition of this invention. Such oils include ASTM D-2226 Types 103, 104A and 104B. They are paraffinic and naphthenic petroleum oils having a preponderance of saturated linear, branched and cyclic hydrocarbon groups. Usually less than 35% of the carbon atoms are aromatic as determined by the use of the viscosity-gravity constant and the refractivity intercept ($n_D^{20} - (d/2)_4^{20}$ where $n_D^{20}$ is the refractive index of the oil at 20° C and $d_4^{20}$ is the density of the oil at 20° C). The viscosity-gravity constant is discussed in "A Method for Classifying Oils Used in Oil-Extended Rubbers", Industrial Products Department, Sun Oil Company, Philadelphia, Pa. (1968); see also Analytical Chemistry, Vol. 30, p. 1224 (1958) and Vol. 48, p. 2232 (1956) and Industrial and Engineering Chemistry (Dec. 1956).

The particular amount of hydrocarbon extending oil used will depend upon the ultimate use intended for the EODM composition; at least 20 phr oil is present. The benefit from the present invention becomes more and more pronounced as the proportion of oil is increased, e.g., above 50 phr and especially above 100 or 125 phr. The practical upper limit is about 200 phr extending oil before the physical properties of the rubber are less than satisfactory.

Any organic peroxide can be used as the curing ingredient. The amount of peroxide used is from about 1–5 phr, usually 2–4 phr, (active ingredient) and the temperatures at which it is added to the brominated EODM generally are from about 60° to 100° C. Representative peroxides include:

2,5-dimethyl-2,5-di(tert-butyl peroxy) hexyne-3 (preferred);
2,5-dimethyl-2,5-di(tert-butyl peroxy) hexane (preferred);
di-tert-butyl peroxide (preferred);
2,5-di(tert-amyl peroxy)-2,5-dimethyl hexane;
1,1'-ethylenebis-[1-tert-amyl peroxycyclohexane];
2,5-di(tert-butyl peroxy)-2,5-diphenylhexane;
2,5-di(tert-butyl peroxy)-2,5-dicyclohexylhexane;
2,5-di(tert-butyl peroxy)-2,5-dibenzylhexane;
2,5-bis(2,5-dimethyl-2-hexylperoxy)-2,5-dimethylhexane;
bis(α-methylbenzyl) peroxide, also called dicumyl peroxide;
bis(α,α-dimethyl-p-methylbenzyl) peroxide;
α,α-dimethylbenzyl tert-butyl peroxide; and
tert-butyl triphenylmethyl peroxide.

Diaralkyl peroxides such as those having the structure:

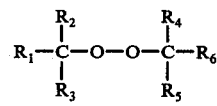

wherein $R_1$ and $R_6$ are aryl; $R_2$, $R_3$, $R_4$, and $R_5$ are H or alkyl having 14–40 carbon atoms (preferably 14–25) can be used in the present invention and are disclosed in U.S. Pat. No. 3,012,016. Other representative organic peroxides are those in which $R_{1-6}$ in the above formula can be alkyl, as described in U.S. Pat. No. 3,079,370. These peroxides are not scorchy and the temperature at which the half-life of the peroxide is 10 hours is normally above 125° C.

In addition to the peroxide a conventional peroxide activator is present, generally in amounts of from about 1–5 phr. These activators include, among others, organic compounds containing at least one, preferably two or more, aliphatic unsaturated groups (preferably allyl or vinyl). The unsaturated groups are frequently attached to Si, O, N or P atoms. Representative peroxide activators include:
2,4,6-trimethyl-2,4,6-trivinylcyclotrisiloxane;
triallyl cyanurate;
diallyl maleate;
diallyl terephthalate;
allyl acrylate;
allyl methacrylate;
dimethyl acetylenedicarboxylate;
tris[5-norbornene-2-methylene] cyanurate;
triallyl isocyanurate;
N,N-diallylacrylamide;
trivinyl isocyanurate;
N,N,N',N'-tetraallyl terephthalamide;
N,N,N',N'-tetraallyl malonamide;
hexaallyl phosphoramide; and
triallyl phosphite.

The unsaturated groups can be attached to a carbonyl group as in m-phenylenebis(maleimide), ethylene diacrylate, propylene diacrylate, and tetramethylenediacrylate. Other unsaturated compounds are disclosed in U.S. Pat. No. 3,406,142. They have structures corresponding to

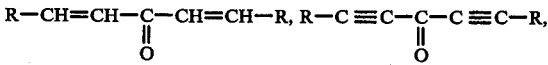

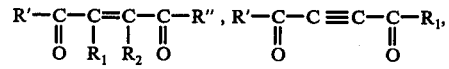

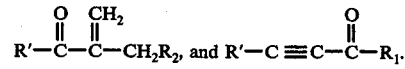

Curing is conducted by heating the EODM composition to temperatures of about 150° – 200° C which is sufficient to decompose the peroxide in about 15 – 30 minutes.

In addition to the EODM copolymer, oil, peroxide, and activator, optionally, the curable compositions can contain conventional components such as carbon black, regular and calcined kaolin clay, talc, whiting, pigments, antioxidants, and antiozonants in conventional amounts, e.g., 100 phr black and 150 phr whiting. In order to minimize the possibility of mold corrosion, an acid acceptor such as MgO or ZnO is often present, e.g., 4–5 phr.

The following examples illustrate the invention in detail.

The EPDM used, made with a premixed VOCl$_3$-/diisobutylaluminum chloride catalyst, has a Mooney viscosity (ML−1 + 4/121° C.) of about 40. The polymer monomer unit composition (by weight) is as follows: ethylene, about 53%; propylene, about 40%; total 1,4-hexadiene, about 7%. There are about 0.58 mols/kg of side-chain 2-butenyl groups.

EXAMPLE I

Bromination of EPDM

A 3-liter glass flask is used as the vessel in which the EPDM is brominated. The flask, equipped with an agitator, a gas inlet tube, a reflux condenser, and a dropping funnel is dried by heating, while being swept with nitrogen.

Polymer solution is prepared by adding 100 grams of EPDM to a liter of carbon tetrachloride and refluxing the mixture at 80° C. Then 0.2 gram of benzoyl peroxide is introduced to initiate the bromination chain reaction. The polymer is allylically brominated by dropwise addition of 10 grams (0.125 mol) of bromine (as a 10% w/v solution in carbon tetrachloride). Addition to the side-chain 2-butenyl groups is avoided by this method which does not allow excess bromine to be present; the observed HBr evolution indicates that the desired substitution reaction is occurring. When all of the bromine has been introduced, refluxing and agitation continue (under nitrogen) for 3–4 more hours.

The allylically brominated EPDM thus prepared is isolated by pouring the polymer solution into about 1.5 volumes of methyl alcohol in a Waring blender. The dry product contains about 5% bromine by weight.

Peroxide Curing of Highly Oil Extended, Allylically Brominated EPDM

Four stocks, one a control, are prepared on a rubber roll mill in accordance with the recipes given below.

Cure rate measurements are made on an oscillating disc rheometer (ODR) available from Monsanto Chemical Co., St. Louis, Missouri. This instrument has a grooved, conical disc which is oscillated (e.g. at 900 cycles per minute) through a 3° arc while pressed tightly between two test pieces. The amount of torque (in inch-pounds) required to oscillate the disc is reported as the measure of viscosity. The difference between the maximum and the minimum torque values, Δ torque, is approximately proportional to the state of cure. The ODR technique is described in Rubber World 147, No. 3, page 68 (1963) and Rubber Chemistry and Technology 34, No. 2, page 451 (1963).

It can be seen from the typical data given below that the highly oil extended, allylically brominated EPDM cures more rapidly and reaches a higher state of cure than the unbrominated, highly oil extended EPDM control. The lower compression set values are consistent with the ODR results for cure times 5 to 30 minutes.

|  | Stocks | | | |
|---|---|---|---|---|
|  | A | B | C | Control-1 |
| EPDM | — | — | — | 100 |
| EPDM (5% Br.) | 100 | 100 | 100 | — |
| Paraffinic Oil* | 100 | 100 | 100 | 100 |
| Carbon Black** | 100 | 100 | 100 | 100 |
| MgO | 5 | 5 | 5 | 5 |
| Organic Peroxide*** | 7 | 7 | 7 | 7 |
| (Active Ingredient) | (3.2) | (3.2) | (3.2) | (3.2) |
| Triallyl isocyanurate | 1 | 3 | 5 | 3 |

| ODR, 177° C. Time (min.) | Torque (in-lbs.) | | | |
|---|---|---|---|---|
| 2.5 | 3 | 2.5 | 3 | 2.5 |
| 5 | 10 | 12 | 11 | 3.5 |
| 10 | 24 | 27 | 25 | 8.5 |
| 20 | 34 | 38 | 37 | 17 |
| 30 | 37 | 41 | 41 | 20 |
| Lowest Torque Value | 2 | 2.5 | 3 | 2 |
| Δ Torque | 35 | 38.5 | 38 | 18 |
| Compression Set determined by Method "B" | | | | |
| 70 hrs. at 100° C., % | 12 | 12 | 12 | 17 |

*Paraffinic Petroleum Oil

The paraffinic petroleum oil, commercially available from Sun Oil Company as "Sunpar" paraffinic oil 2280, has Saybolt universal viscosity values of 2907 sec. and 165 sec. at 100° F. and 210° F., respectively. It is an ASTM D-2226 Type 104B oil having a molecular weight of 720, a specific gravity of 0.8916 at 60° F. and a refractive index, D20, of 1.4908.

**Carbon Black

The FEF carbon black is an ASTM D 1765-58 N-550 having a surface area of 36 to 52 sq. meters/gram.

***Organic Peroxide

The organic peroxide employed during the cure (Luperco 130XL) contains 45% active ingredient on an inert filler and has the following structure:

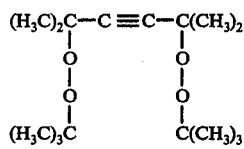

When m-phenylene bis(maleimide) [HVA-2] is substituted for triallyl isocyanurate in the above composition B, the ODR Δ torque value after 30 minutes at 175° C. is substantially the same as that of composition B. When EPDM having about 2% bromine is substituted for EPDM having 5% bromine in composition B, the ODR Torque value after 30 minutes at 177° C. is slightly less, i.e., about 32 inch-lbs.

EXAMPLE II

Samples of Stocks D and E and Controls 2 and 3 are compounded on a rubber roll mill:

|  | Stocks | | | |
|---|---|---|---|---|
|  | D | Control 2 | E | Control 3 |
| EPDM | — | 100 | — | 100 |
| EPDM (4.1% Br.) | 100 | — | 100 | — |
| Paraffinic Oil* | 100 | 100 | 100 | 100 |
| Carbon Black** | 100 | 100 | 100 | 100 |
| MgO | 5 | 5 | 5 | 5 |
| Organic Peroxide*** | 5 | 5 | 8.3 | 8.3 |
| (Active Ingredient) | (2.3) | (2.3) | (3.7) | (3.7) |
| m-Phenylenebis |  |  |  |  |

-continued

| | Stocks | | | |
|---|---|---|---|---|
| | D | Control 2 | E | Control 3 |
| (maleimide) | 3.3 | 3.3 | 3.3 | 3.3 |

*As in Example I
**As in Example I
***As in Example I

The following data are representative of their curing behavior:

| ODR, 177° C. Time (min.) | Torque (in-lbs.) | | | |
|---|---|---|---|---|
| 2.5 | 8 | 3 | 9 | 3.5 |
| 5 | 31 | 6 | 35 | 16 |
| 10 | 44 | 13 | 49 | 21 |
| 15 | 47 | 21 | 54 | 25 |
| 20 | 49 | 22 | 55 | 27 |
| 30 | 50 | 23 | 56 | 28 |
| Lowest Torque Value | 4 | 3 | 5 | 3 |
| Δ Torque | 46 | 20 | 51 | 25 |
| Compression Set (%)+ | | | | |
| after 22 hrs., 70° C. | 6 | 19 | 5 | 14 |
| after 70 hrs., 100° C. | 16 | 17 | 16 | 17 |

| | Stocks | | | |
|---|---|---|---|---|
| Stress Strain at 25° C+ | D | Control 2 | E | Control 3 |
| Modulus at 100% Ext. (kPa) | 3100 | 690 | 2930 | 860 |
| Modulus at 200% Ext. (kPa) | — | 1720 | — | 2280 |
| Tensile Strength (kPa) | 6960 | 6380 | 6890 | 6960 |
| Extension at Break (%) | 140 | 540 | 150 | 560 |
| Permanent Set at Break (%) + cured at 177° C for 30 min. before testing | 2 | 22 | 2 | 12 |

EXAMPLE III

A sample of Stock F and a Control are compounded on a rubber roll mill:

| | F | Control 4 |
|---|---|---|
| EPDM | — | 100 |
| EPDM (5% Br) | 100 | — |
| Paraffinic Oil* | 20 | 20 |
| Calcined Clay | 150 | 150 |
| MgO | 5 | 5 |
| Organic Peroxide*** | 5 | 5 |
| (Active Ingredient) | (2.3) | (2.3) |
| m-Phenylene bis (maleimide) | 4 | 4 |

*As in Example I
**As in Example I

The following data are representative of their curing behavior:

| ODR, 177° C. Time (min.) | Torque (in-lbs.) | |
|---|---|---|
| 2.5 | 20 | 10 |
| 5 | 61 | 34 |
| 10 | 86 | 53 |
| 15 | 96 | 65 |
| 20 | 101 | 73 |
| 30 | 104 | 83 |
| Lowest Torque Value | 6 | 4 |
| Δ Torque | 98 | 79 |

| | F | Control 4 |
|---|---|---|
| Compression Set (%)+ | | |
| after 70 hrs., 100° C. | 14 | 15 |
| Stress Strain at 25° C+ | | |
| Modulus at 100% Ext. (kPa) | 7450 | 3860 |
| Modulus at 200% Ext. (kPa) | — | 6240 |
| Tensile Strength (kPa) | 10100 | 7450 |
| Extension at Break (%) | 190 | 260 |
| Permanent Set at Break (%) | 6 | 10 |
| +cured at 177° C. for 30 min. before testing | | |

EXAMPLE IV

Bromination of EPDM

After a solution of 100 grams of EPDM in carbon tetrachloride has been heated to 60° C., 12 grams of N-bromosuccinimide (NBS) and 0.2 gram of benzoyl peroxide (activator for bromination) are added. The resulting mixture is kept at 60° C. for 5 hours. Finally, a 96-gram yield of allylically brominated EPDM (2.9% bromine) is obtained by treating the reaction mixture with methanol in a blender and drying in a vacuum oven at 70° C.

This product is compounded as follows on a rubber roll mill:

| EPDM (2.9% Br) | 100 |
|---|---|
| Paraffinic Oil* | 100 |
| Carbon Black** | 100 |
| MgO | 5 |
| Organic Peroxide*** | 5 |
| (Active Ingredient) | (2.3) |
| m-Phenylene bis (maleimide) | 3.3 |

The following data are typical of its curing behavior:

| ODR, 177° C. Time (min.) | Torque (in-lbs.) |
|---|---|
| 2.5 | 34 |
| 5 | 47 |
| 10 | 59 |
| 15 | 64 |
| 20 | 66 |
| 30 | 69 |
| Lowest Torque Value | 9 |
| Δ Torque | 60 |
| Stress Strain at 25° C.+ | |
| Modulus at 100% Ext. (kPa) | 4340 |
| Tensile Strength (kPa) | 8340 |
| Extension at Break (%) | 150 |
| Permanent Set at Break (%) | 1 |
| +cured at 177° C. for 30 min. before testing | |

*As in Example I
**As in Example I
***As in Example I

EXAMPLE V

Allylic Bromination of EPDM

A 100 gram portion of EPDM is dissolved in a liter of refluxing carbon tetrachloride (about 77° C) at atmospheric pressure. After 15 grams of N-bromosuccinimide (NBS) have been added, the mixture is agitated at reflux for 4 hours while irradiated by a special white light (275-watt General Electric Sunlamp) providing radiation at frequencies suitable to activate the NBS. The product EPDM containing 3 wt. % allylic bromine is subsequently recovered by mixing the resulting solution at room temperature with an equal volume of methanol (contact time: about 1-2 minutes) and drying the precipitated polymer in a vacuum oven at 70° C.

Naphthenic Petroleum Oil

The naphthenic petroleum oil (commercially available from Exxon as "Flexon" 765) has a flash point of 229.5° C (445° F), a Saybolt Universal viscosity of 58 seconds at 98.9° C (210° F), and a specific gravity (15.5° C/15.5° C; 60° F/60° F) of 0.8980. About 45% of its carbon atoms are naphthenic and 55% are paraffinic. Rostler values: 0% nitrogen bases; 1.5% first Acidaffins; 28.3% second Acidaffins; 70.2% paraffins.

Aromatic Petroleum Oil

The aromatic petroleum oil (commercially available from Sun Oil Company as "Sundex" 790 is an ASTM D-2226 Type 102 oil having a molecular weight of 375, a flash point (open cup) of 223.8° C (435° F). Saybolt Universal viscosities of 3000 sec. and 85.7 sec. at 37.8° C (100° F) and 98.9° C (210° F), respectively, a specific gravity 15.5° C/15.5° C (60° F/60° F) of 0.9806, and a refractive index, $D^{20}$, of 1.5532. About 37% of its carbon atoms are aromatic, 28% are naphthenic, and 35% are paraffinic. By molecular type (clay-gel) analysis (ASTM D 2007) there are 0.05 wt. % asphaltenes, 7.90 wt. % polar compounds, 68.75 wt. % aromatic compounds, and 23.30 wt. % saturates.

SRF Carbon Black

The SRF carbon black is an ASTM D 1765-68 Type N-761 having a surface area of about 17 to 33 sq. meters/grams.

Curing Behavior

Six stocks are prepared in accordance with the following recipes. Stocks G, H, and I are within the scope of the present invention. Their respective Controls 5, 6, and 7, which are outside the scope of the present invention, are presented only for purpose of comparison.

|  | G | Control 5 | H | Control 6 | I | Control 7 |
|---|---|---|---|---|---|---|
| EPDM | — | 100 | — | 100 | — | 100 |
| EPDM (3% Br) | 100 | — | 100 | — | 100 | — |
| MgO | 5 | 5 | 5 | 5 | 5 | 5 |
| SRF Black | 260 | 260 | 260 | 260 | 260 | 260 |
| Paraffinic Oil* | 125 | 125 | — | — | — | — |
| Naphthenic Oil | — | — | 125 | 125 | — | — |
| Aromatic Oil | — | — | — | — | 125 | 125 |
| Organic Peroxide*** | 5 | 5 | 5 | 5 | 5 | 5 |
| (Active Ingredient) | (2.3) | (2.3) | (2.3) | (2.3) | (2.3) | (2.3) |
| m-Phenylene bis (maleimide) | 3.3 | 3.3 | 3.3 | 3.3 | 3.3 | 3.3 |

*As in Example I
***As in Example I

The following data are representative of their curing behavior:

| ODR, 177° C | G | Control 5 | H | Control 6 | I | Control 7 |
|---|---|---|---|---|---|---|
|  |  |  | Torque (in.-lbs.) |  |  |  |
| Time (min.) 2.5 | 16.5 | 5.5 | 15 | 5 | 11.5 | 4.5 |
| 5 | 27 | 11 | 25 | 9 | 20 | 5.5 |
| 10 | 33 | 15 | 31.5 | 14 | 27.5 | 9 |
| 15 | 35.5 | 15.5 | 34 | 15 | 30 | 10 |
| 20 | 37 | 16 | 35.5 | 15.5 | 31 | 10.5 |
| 30 | 38 | 17 | 37 | 16 | 32.5 | 10.5 |
| Lowest Torque value | 11.5 | 5 | 9 | 4 | 7.5 | 4 |
| Δ Torque | 26 | 12 | 28 | 12 | 25 | 5.5 |
| Maximum Slope | 5.6 | 2.2 | 4.6 | 2.2 | 3.6 | 0.8 |
| Compression Set (%)+ After 70 hours, 100° C | 21 | 19 | 23 | 21 | 24 | 38 |
| Shore "A" Hardness | 84 | 67 | 86 | 65 | 86 | 66 |
| Strain at 25° C |  |  |  |  |  |  |
| Modulus at 100% Ext. (kPa) | — | 1930 | — | 2070 | — | 1380 |
| Modulus at 200% Ext. (kPa) | — | 4760 | — | 4380 | — | 3100 |
| Tensile Strength (kPa) | 6900 | 5830 | 8960 | 5580 | 10170 | 5030 |
| Extension at Break (%) | 75 | 250 | 75 | 255 | 95 | 405 |
| Permanent Set at Break (%) | 1 | 6 | 1 | 9 | 2 | 55 |

+after a 30-minute cure at 177° C.

I claim:

1. An elastomeric peroxide vulcanizable copolymer composition of ethylene, at least one $C_3$-$C_{18}$ alpha-monoolefin, and at least one monoreactive nonconjugated diene containing at least about 0.1 weight percent allylically incorporated bromine, at least about 20 phr of a hydrocarbon extending oil, about 1-5 phr (active ingredient) of an organic peroxide and an unsaturated peroxide activator.

2. A composition of claim 1 wherein the alpha-monoolefin is propylene.

3. A composition of claim 1 wherein the nonconjugated diene is 1,4-hexadiene.

4. A composition of claim 1 wherein the nonconjugated diene is ethylidene norbornene.

5. A composition of claim 1 wherein the nonconjugated diene is dicyclopentadiene.

6. A composition of claim 1 wherein the peroxide is 2,5-dimethyl-2-5-di(tert-butylperoxy) hexyne-3, 2,5-dimethyl-2,5-di(tert-butylperoxy) hexane, or di-tert-butyl peroxide.

7. A composition of claim 1 wherein the activator is triallylcyanurate or m-phenylenebis(maleimide).

8. A composition of claim 1 wherein the extending oil is a paraffinic petroleum oil.

9. A composition of claim 2 wherein the copolymer contains 1-6 weight percent allylically incorporated bromine.

10. A composition of claim 9 containing 2-4 phr (active ingredient) of organic peroxide.

11. A composition of claim 2 containing more than 50 phr hydrocarbon extending oil.

12. A composition of claim 2 containing more than about 100 phr hydrocarbon extending oil.

13. A composition of claim 2 containing about 1-5 phr peroxide activator.

14. A composition of claim 11 wherein the copolymer contains about 1-6 weight percent allylically incorporated bromine.

* * * * *